United States Patent
Shearer et al.

(10) Patent No.: US 10,952,375 B2
(45) Date of Patent: Mar. 23, 2021

(54) CROP HEADER WITH WING BALANCE CALIBRATION

(71) Applicant: MacDon Industries Ltd., Winnipeg (CA)

(72) Inventors: Bruce Robert Shearer, Winnipeg (CA); Eric Grenier, Somerset (CA); Lance Willer, Winnipeg (CA); Francois Talbot, Winnipeg (CA)

(73) Assignee: MacDon Industries Ltd, Winnipeg (CA)

( * ) Notice: Subject to any disclaimer, the term of this patent is extended or adjusted under 35 U.S.C. 154(b) by 216 days.

(21) Appl. No.: 16/113,521

(22) Filed: Aug. 27, 2018

(65) Prior Publication Data

US 2020/0000032 A1 Jan. 2, 2020

Related U.S. Application Data

(60) Provisional application No. 62/763,122, filed on Jun. 29, 2018.

(51) Int. Cl.
*A01D 41/14* (2006.01)
*A01B 63/00* (2006.01)

(52) U.S. Cl.
CPC .......... *A01D 41/141* (2013.01); *A01B 63/008* (2013.01)

(58) Field of Classification Search
CPC .... A01D 41/141; A01D 41/144; A01D 47/00; A01D 41/145; A01D 41/14; A01D 34/04; A01B 63/008; A01B 63/10
See application file for complete search history.

(56) References Cited

U.S. PATENT DOCUMENTS

| 6,675,568 | B2 * | 1/2004 | Patterson | A01D 41/14 56/208 |
| 8,051,633 | B2 * | 11/2011 | Figgins | A01D 41/141 56/181 |
| 9,198,349 | B2 * | 12/2015 | Ritter | A01D 41/145 |
| 9,668,412 | B2 * | 6/2017 | Ritter | A01D 41/141 |
| 9,775,291 | B2 * | 10/2017 | Neudorf | A01D 41/145 |
| 9,968,033 | B2 * | 5/2018 | Dunn | F15B 13/0401 |
| 10,433,486 | B2 * | 10/2019 | Vandeven | A01D 41/14 |
| 10,462,968 | B2 * | 11/2019 | Shearer | A01D 41/145 |
| 10,568,266 | B2 * | 2/2020 | Vandeven | A01D 67/00 |
| 2008/0072560 | A1 * | 3/2008 | Talbot | A01D 41/14 56/208 |
| 2018/0368317 | A1 * | 12/2018 | Schulze Selting | A01D 34/008 |

(Continued)

*Primary Examiner* — Arpad Fabian-Kovacs

(74) *Attorney, Agent, or Firm* — Miller Canfield

(57) ABSTRACT

In a crop harvesting header with a center section and two wings where each wing is pivotal relative to the center section about a pivot axis extending in a generally forward direction which includes a balance system to maintain a balanced ground force distribution across the width of the header there is provided an automatic adjustment system for maintaining proper balance. The system includes a sensor which repeatedly, over a time period during which the header is operating, detects data relating to the positions, distance from the ground or weight applied to the ground of each wing frame portion, a processor arranged in response to the sensed data to calculate a value representative of the positions and an adjustment mechanism for effecting an adjustment of the balance system in response to the value.

18 Claims, 6 Drawing Sheets

(56) References Cited

U.S. PATENT DOCUMENTS

2019/0183048 A1* 6/2019 Flintoft .................. F02D 41/12
2019/0200523 A1* 7/2019 Fay, II ................. A01D 41/145
2019/0230857 A1* 8/2019 Thomson ............. A01D 34/006

* cited by examiner

CROP HEADER WITH WING BALANCE CALIBRATION

This application claims the benefit under 35 USC 119 (e) of provisional application 62/763,122 filed Jun. 29, 2018.

This invention relates to header of a crop cutting apparatus such as a swather or a combine harvester which includes multiple sections defining a center section and two wing sections where the sections are balanced to maintain a constant ground force across the width as the total ground force changes and particularly to a calibration system for the wing balance.

In U.S. Pat. No. 7,918,076 (Talbot) by the present applicants issued Apr. 6 2011 is disclosed a flex draper header which includes a center section and two wing sections that are hinged together. The three header sections are interconnected with a balance linkage that uses the weight of the header to keep the wings in balance and maintain consistent cutterbar pressure across the width of the header.

To maintain a balanced ground force distribution across the width of the header, the interconnecting linkage which attaches the wing frame to the center frame requires periodic adjustment.

That is, if the adjustment of the balance system to the wings is set accurately the wings follow the ground with even ground pressure across the width of the header. However if the wings are set with too light a down pressure, that is the lift force is too great, the wings will have a tendency to rise and if the lift force is too low the wings will have a tendency to fall.

The current adjustment method for adjusting the wing balance requires the operator to manually measure the force required to move the wing up/down and make an adjustment to the linkage by turning a draw bolt. With this current adjustment method, proper adjustment of the header is reliant on having the operator correctly perform these adjustments. Furthermore, it is often not obvious to an operator from observation of the operation of the header during harvesting that an adjustment is required.

SUMMARY OF THE INVENTION

It is one object of the present invention to provide a calibration system for the wing balance on a flex header of the above general type which optimizes the wing balance settings without the need for the operator to provide input.

According to the invention there is provided a crop harvesting header for use in a harvesting operation comprising:

a main frame structure extending across a width of the header for movement in a forward direction generally at right angles to the width across ground including a crop to be harvested;

a mounting assembly for carrying the main frame structure on a propulsion vehicle;

a cutter bar across a front of the table arranged to move over the ground in a cutting action;

the main frame structure including a center frame portion, a first wing frame portion and a second wing frame portion;

each of the wing frame portions being connected to the center frame portion by a pivot coupling arranged for pivotal movement relative to the center frame portion about a pivot axis extending in a generally forward direction to positions of the wing frame portion which are in line with, raised above and lowered below the center frame portion;

a balance system for applying a lifting force to the center frame portion and a balanced wing lifting force to each of the wing frame portions to support the wing frame portions to provide a balanced ground force distribution across the width of the header including the center frame portion and the wing frame portions;

and an adjustment system arranged to provide adjustment of the balance system to maintain said balanced ground force distribution, the adjustment system comprising:

at least one sensor repeatedly, over a time period during which the header is operating in said harvesting operation, detecting data relating to a condition of the balance system;

a processor arranged in response to said data sensed by said at least one sensor to calculate a value representative of said data of the wing frame portions over the time period;

the adjustment system effecting an adjustment of the balance system in response to said value.

The term "balance" as used herein does not require an actual balance beam to which forces are applied as out in the above patent to Talbot but other systems to balance the lifting forces applied to the center section and to the wing sections can be provided including arrangements using adjustable springs or adjustable lift cylinders. For example in U.S. Pat. No. 9,968,033 (Dunn) issued May 15 2018 and in further published US applications 2018-0153010 and 2018-0153102, the disclosures if which documents are incorporated herein by reference, is disclosed a processor controlled hydraulic cylinder system which provides a lifting force to a header. The processor is controlled to adjust the pressure in the cylinders to provide a required lift force which can be varied rapidly in response to movement of the header. The cylinders can be used on a wing type header to support a center section relative to the support vehicle and the wings of the header relative to the center section. in this arrangement the processor controls the pressure in the cylinders to provide a controlled lifting force to the sections of the header with the intention of controlling their movement and of maintaining a required ground force from the sections to the ground and balancing that ground force between the sections. Thus the balance system in this embodiment is part of the programming of the processor with the programming also providing other responses of the sections of the header as set out the above documents. In this arrangement therefore the adjustment system is a part of the program of the processor so that the analysis of the sensor data to calculate a value representative of said data of the wing frame portions over the time period is used as an input into the processor to manage the lift forces generated so that the ground force is maintained over time balanced across the three sections.

There are a number of different ways for the sensor or sensors to detect the relevant data on the balance system.

In one preferred arrangement the sensor is arranged to detect positions of each wing frame portion relative to the center frame portion. This can be done by directly detecting the relative positions or by detecting the positions of each relative to the ground.

In another arrangement, a plurality of sensors operate, for detecting data relating to a condition of the balance system, by detecting a force applied by each of the wing frame portions and the center frame portion to the ground.

That is for example there is provided a plurality of separate ground engaging elements at spaced positions along the main frame structure for supporting the cutter bar from the ground and the plurality of separate sensors are each arranged at a respective one of the ground engaging elements for providing an output related to a force applied by the header through the respective ground engaging elements to the ground. These changing forces can be detected and averaged over time to analyze the amount of time where one sensor is more loaded relative to another which is indicative of the relative positions of the wing frame portions and the center.

In one preferred example, the sensor operates by detecting movement of a component of the wing frame portion relative to a component of the center frame portion. This can be done by detecting a distance between the components as the pivotal movement of the wing occurs or can be done by detecting the angle of the position of the wing at the pivot using a conventional angle detecting sensor and providing signals indicative of the changes in the angle as the wing moves up and down relative to the center portion.

In another arrangement the sensing system includes a series of sensors on the center portion and the wing portions and operates by detecting a height of each of the wing frame portions and the center frame portion from the ground. Even though the ground is changing in height, the measurement over time of the height of each portion should provide an average height which is the same at each sensor if the balance system is adjusted correctly. If one or both wing portions show a difference in height from the ground over the time period, this provides over the time period a value which is related to the positions of each wing frame portion relative to the center frame portion. This system thus uses the ground as a reference location and detects the positions of the center and wing portions relative to this reference.

Preferably the system includes at least one sensor for detecting whether the header is operating in said harvesting operation so that periods when the harvester is not operating are discounted from the calculation.

The sensor for detecting whether the header is operating can include a knife speed sensor but other additional or alternative sensors can be used.

Preferably the processor calculates as said value an indication as to whether the wing frame portions are predominantly raised or predominantly lowered during the time period. This can be done by many different calculations. For example the system can use an average value of the position over a set time period. Alternatively the system can use a summation of values of time during which the wings are raised relative to being lowered. The system can use a set time period which is then repeated. However calculations can be made which enable the system to act more quickly than the set time period if significant divergence from the average is determined.

Preferably the processor receives and uses in calculation independent sensor data relating to the independent positions of the wing frame portions and the processor determines independent adjustment values for the separate wing frame portions from the independent sensor data. However the balance system can in some cases be applied to both wings so that no independent data is required.

In one example, the processor includes a look up table for determining an amount of adjustment in relation to the calculated value. That is the amount of divergence of the average value calculated from zero can be indicative of a severe out of balance situation with the look-up-table providing different values for adjustment accordingly.

Preferably the processor is arranged such that when the value is within a predetermined range of acceptability, no adjustment is made. In this way the system is maintained at a general balance situation unless an out of balance is determined beyond the acceptable range.

In order to maintain a track of the adjustments required, the processor preferably records the new adjustment position after an adjustment is effected.

Thus, if the wings are set perfectly they will follow the ground with even ground pressure across the width of the header. However if they are too light, they will nominally float up and if they are too heavy they will nominally float down. It is assumed for the calculation that the profile of the terrain across the width of the header will vary but that when averaged out over a set distance as determined by the set period of time of harvesting, the average ground profile across the width of the header would be level. Thus the average value of the positions should be zero.

The system records the wing position while harvesting over a set period of time. The system uses various sensors to determine if the header is harvesting. For example, the system acts to record wing position once every second over a 15 minute harvesting period and calculate an average wing position over that 15 minute period. At the end of the wing position data collection time interval, an actuator adjusts the wing balance based on the average wing position value that was calculated. If the average wing position is above the in-line position, the actuator automatically adjusts the wing balance a set amount, depending on the calculated average value. This can be a fixed amount but more preferably is determined from the look-up-table depending on the value of the difference in average. Once the system has completed the adjustment, it resumes wing position data collection and repeats the process which results in continuous calibration of the system. When the calculated average position is within a predetermined range of acceptability, no adjustment is made.

Thus the system herein uses an actuator to adjust the balance linkage using an actuator. It will be appreciated that the actual mechanism of the actuator, such as a screw or linear actuator can be selected depending on the design of the balance system. Thus the system herein provides a method of adjustment using the concept that perfectly balanced wings will have the average wing position as zero or level at the in-line position after cutting for a set period of time.

In many cases, as defined hereinafter there is provided a central section mounted on the vehicle and two wing sections, which is in most cases the most practical arrangement providing sufficient flexibility without excessive complication and expense. However the principles of this invention can be applied to alternative constructions which allow a plurality of sections to be carried on a propulsion vehicle and for the weight per unit length of each as applied to the ground to vary as the total weight is varied.

Thus in one example there may also be two additional outer wing portions each pivotally mounted to an outer end of the inner wing portion and each having a respective pivot coupling and linkage which controls the position of the cutter bar as defined herein.

The term "spring" as used in this document is not intended to be limited to a particularly type of element which provides a spring or biasing force but merely defies any element which will allow resilient movement of one component relative to another. This can be provided by a mechanical flexing link such as a coil or tension spring or can be provided by fluid such as air or hydraulic cylinders and the term is also intended to include the suitable mechanical couplings of those links to the required elements. Hydraulic cylinders with suitable accumulators for taking up and releasing fluid to the cylinders are effective in this regard.

This specification refers to "bending" of the cutter bar. This bending movement can be obtained by providing a specific hinge between two parts of the bar or by providing a cutter bar which can flex sufficiently to accommodate the required bending without the necessity for an actual hinge defining a specific pivot axis.

The term "skid element" used in the above definition is not intended to be limited to a particular component of the header and may be provided by any element which physically engages the ground as the cutter bar and knife elements carried thereby proceed across the ground. Thus the skid element may be provided by the cutter bar itself or by an additional component behind the cutter bar. In addition, closely spaced rollers or other elements which roll over the ground and thus reduce friction may be used provided that the lifting force is spread evenly across the cutter bar to provide the floating action to which this invention is directed, although this is not generally necessary and not conventionally used.

The mounting assembly may be an adapter frame arranged for connection of the header to an existing feeder house of a combine harvester. However such an adapter is not essential and the mounting assembly may be constituted by simply connecting elements which directly couple the header to the combine harvester.

In most cases the header is unsupported by ground wheels such that all lifting forces from the ground are communicated through an elongate skid element. However this system can be used where other ground engaging elements are provided

BRIEF DESCRIPTION OF THE DRAWINGS

Embodiments of the invention will now be described in conjunction with the accompanying drawings in which.

DETAILED DESCRIPTION

Reference is made to U.S. Pat. No. 6,865,871 (Patterson) issued Mar. 15, 2005 which disclose details of an adapter for mounting a header on a combine harvester, the disclosure of which is incorporated herein by reference.

Figure 1:
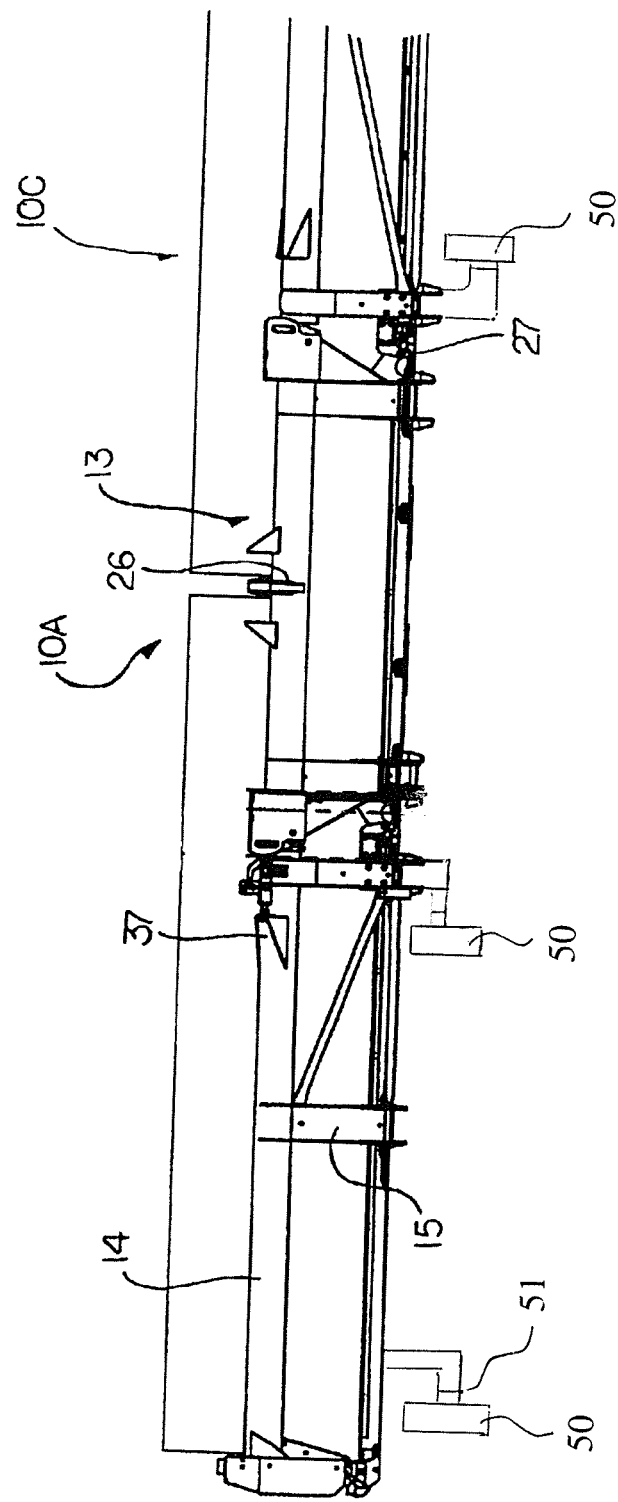
FIG. 1 is taken from U.S. Pat. No. 6,675,568 and shows a schematic rear elevational view of header of the general type with which the present invention is concerned with the combine harvester which acts as a propulsion vehicle and the associated adapter being omitted for convenience of illustration. A sensor system according to the present invention which is responsive to the load applied by the center section and wing sections to the ground is included.
Figure 2:
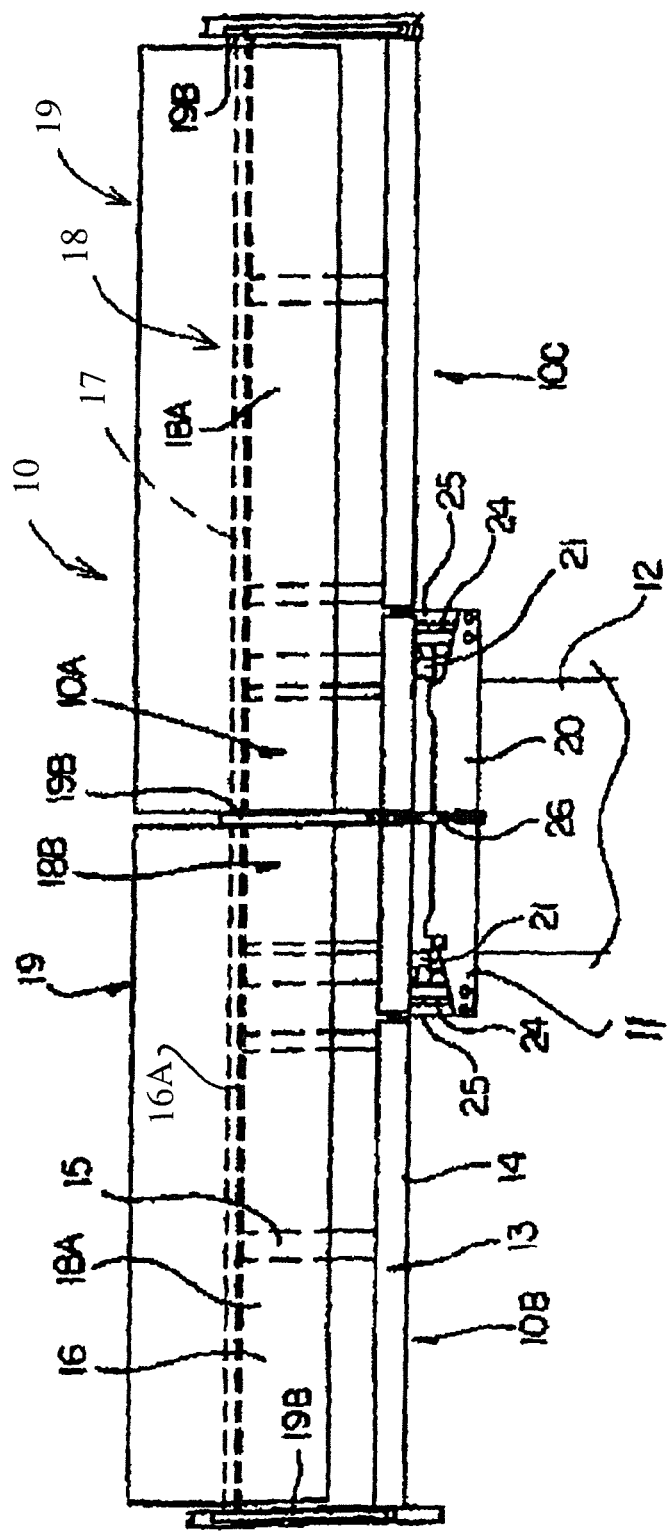
FIG. 2 is taken from U.S. Pat. No. 6,675,568 and shows the PRIOR ART schematic top plan view of the header of FIG. 1.

Reference is also made to U.S. Pat. No. 6,675,568 (Patterson) issued Jan. 13, 2004 which disclose details of a flexible header of the general type with which the present invention is concerned, the disclosure of which is incorporated herein by reference. FIGS. 1 and 2 and part of the following description are taken from that patent for the convenience of the reader. Further details not included herein can be obtained by reference to that patent.

Reference is also made to U.S. Pat. No. 7,918,076 (Talbot) issued Apr. 5, 2011 which disclose in FIG. 3 in rear elevational view a header 10 carried on an adapter 11 or mounting assembly attached to the feeder house 12 of a combine harvester. In FIG. 1 the adapter is omitted for convenience of illustration.

The header 10 includes a frame 13 defined by a main rear beam 14 and a plurality of forwardly extending arms 15 which extend downwardly from the beam 14 and then forwardly underneath a table 16 which extends across the header. At the forward end of the table 16 is provided a cutter bar 17. On top of the table 16 is provided a draper transport system 18 which carries the crop from the cutter bar across the header to a discharge location at the feeder house 12. The draper system 18 thus include two side drapers 18A extending from respective ends of the header inwardly toward the feeder house and a center adapter section 18B which acts to feed the crop from the side drapers 18A rearwardly to the feeder housing.

The header further includes a reel 19 including a beam on which is mounted a plurality of reel bats (not shown) which are carried on the beam for rotation with the beam around the axis of the beam. The beam is carried on reel support arms 19B which extend from the beam rearwardly and upwardly to a support bracket attached to the transverse main beam 14. The reel arms can be raised and lowered by hydraulic cylinders 19D connected between the respective arm and the beam 14.

The above description of the header refers only schematically to the construction since the details of the construction are well known to one skilled in the art.

Referring also to FIG. 2, the adapter 11 comprises a frame 20 which attaches to the feeder house 12 and carries at its lower end a pair of forwardly extending pivotal arms 21 which form respective first and second spring biased lifting members and which extend forwardly underneath respective ones of the frame members 15 of the header. The pivotal arms 21 can pivot upwardly and downwardly about respective pivot pins 23 each independently of the other arm. Each arm is supported by a respective spring 24 attached to the respective arm 21. Thus the respective springs 24 provide respective first and second spring lifting forces which acts to pull up the respective arm 21 and provide a lifting force underneath the header at a lifting point partway along the respective frame member 15 and underneath the draper 18 and the table 16.

At the center of the adapter is provided a link 26 which extends from the frame 20 forwardly in the form of a hydraulic cylinder which allows adjustment of the length of the cylinder thus pivoting the header forwardly and rearwardly about the support point of the arms 21 on the underside of the header. Thus the attitude of the header, that is the angle of the table 16 to the horizontal can be tilted by operation of the cylinder forming the link 26.

In addition the attitude of the header about an axis extending forwardly of the direction of movement that is at right angles to the transverse beam 14 is effected by the independent pivotal movement of the arms 21 provided by the springs 24 which act as a floatation system. In addition the whole header can float upwardly and downwardly on the springs 24 with the link 26 pivoting to accommodate the upward and downward movement and the arms 21 pivoting about the respective pin 23.

The table 16 provides behind the cutter bar 17 a skid plate 16A which is arranged to engage the ground. Thus upward force is provided from the ground which tends to lift the header taking weight off the support springs 24. In practice the springs are adjusted so that the springs act to support the majority of the weight of the header leaving a relatively small proportion of the weight to rest on the ground. Thus the header can float upwardly and downwardly as the ground provides areas of different height with one end of the header being movable upwardly independently of the other end by independent flexing of the springs 24. Thus the header tends to follow the ground level.

The beam 14 forms a main frame structure which is divided into a number of separate pieces depending upon the number of sections of the header. In the embodiment shown there are three sections including a center section or center frame portion 10A, a first wing section or wing frame portion 10B and a second wing section or wing frame portion 10C. The center section 10A is mounted at the adapter so that the arms 21 extend into engagement with the center section. The wing sections are pivotally connected to the center section such that each can pivot upwardly and downwardly about a respective pivot axis generally parallel to the direction of movement.

Figure 4:
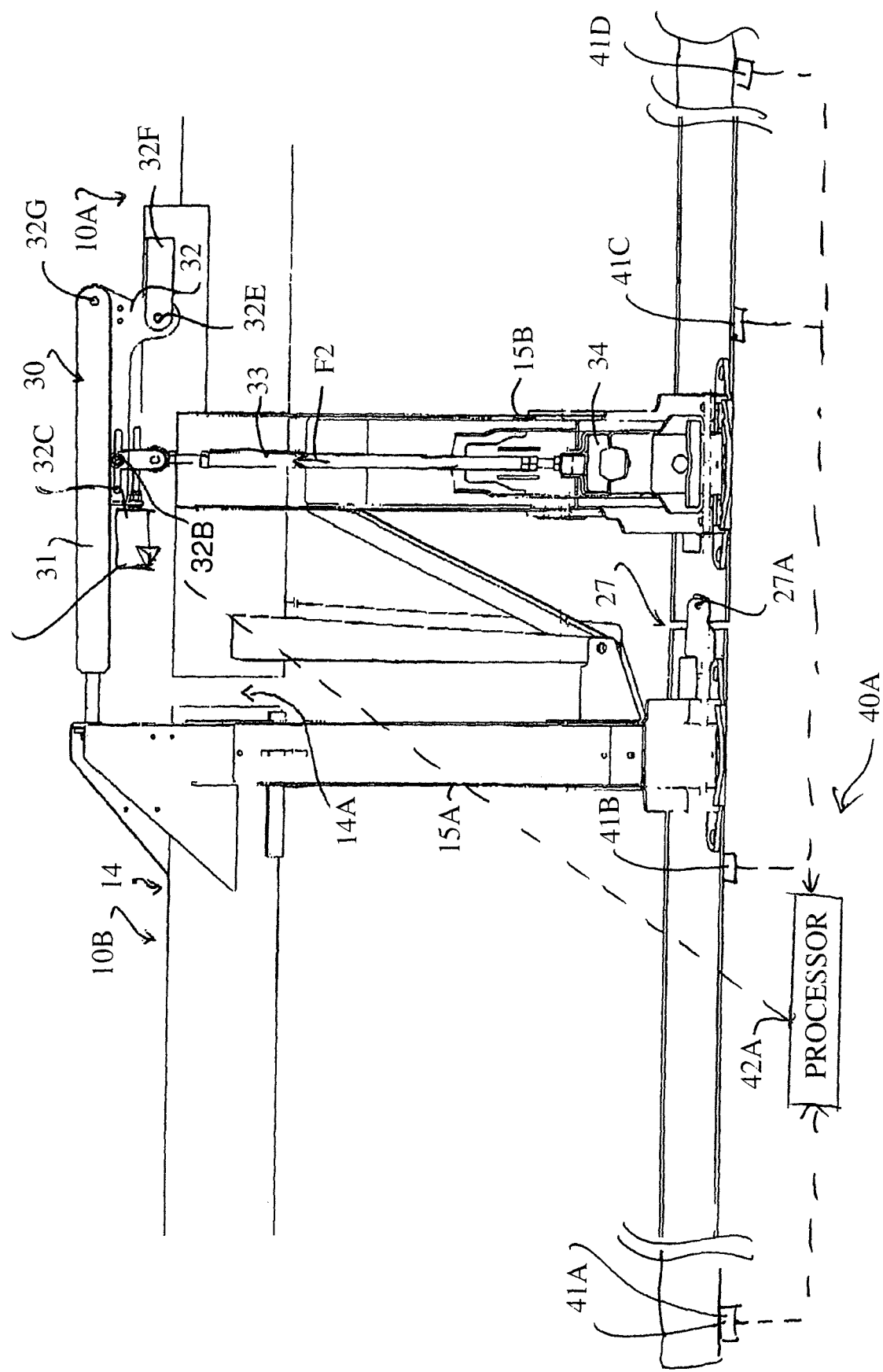
FIG. 4 shows a rear view of the header with the adapter removed and showing another embodiment of the adjustment system of the present invention.

The beam 14 is split into three portions each co-operating with a respective one of the sections 10A, 10B and 100 and defining a main beam therefor. Each section of the beam 14 includes respective ones of the frame members 15 which support the respective portion of the table. Thus as best shown in FIG. 4, there is a break 14A between the beam sections 14 of the center section 10A and one wing section 10B. The end most frame member 15A of the wing section 10B is arranged at the break. The end frame member 15B of the center section 10A is spaced inwardly from the break leaving space for a pivot coupling 27 extending from the frame member 15A to the frame member 15B and defining a pivot pin 27A defining a first pivot connection lying on the pivot axis between the wing section 10B and the center section 10A.

The two sections 10A and 10B are supported each relative to the other for pivotal movement of the wing section 10B about an axis extending through the pin 27A and through the break 14A so that the wing section is supported at its inner end on the center section but can pivot downwardly at its outer end so that the weight at the outboard end is unsupported by the center section and causes downward or counter clockwise pivotal movement of the wing section 10B.

The wing section 10C is mounted in an identical or symmetrical manner for pivotal movement about the other end of the center section 10A. The amount of pivotal movement allowed of the wing section relative to the center section about the axis of the pivot pin 27A is maintained at a small angle generally less than 6° and preferably less than 4° as controlled by suitable mechanical stop members which are provided at a suitable location with the required mechanical strength to support the wing frame section against upward or downward movement beyond the stop members.

In one example, the outboard weight of the wing section 10B is supported on a linkage 30 which communicates that weight from the inner end of the beam 14 of the section 10B through to the support for the center section 10A at the springs 24. The linkage is shown particularly in FIG. 3 and includes a tension link 31 extending from the inner end of the beam 14 to a bell crank 32 at the outer end of the center section 10A on the beam 14 together with a further compression link 33 which extends downwardly from the bell crank to a balance beam 34 located on the center section 10A at its interconnection with the arm 21.

The linkage operates to transfer the outboard weight of the wing section inwardly to the center section and at the same time to balance the lifting force provided by the springs 24 so that it is proportionally applied to the center section and to the wing section.

The header is attached to the combine feeder house using the float system described previously that supports the header so that it can be moved up when a vertical force about 1% to 15% of its weight is applied to the cutter bar from the ground. The reaction of the float linkage that typically supports 85% to 99% of the header weight on the header is used to balance the weight of the wings.

The system is designed so that if the operator sets the float so that the float system supports 99% of the header weight then the remaining 1% will be evenly distributed across the cutter bar. If the operator changes the float so that 85% is supported by the combine harvester then the remaining 15% is also evenly distributed across the cutter bar without the operator making adjustments. Thus, not only is the total lifting force to each sections varied in proportion to the total lifting force but also that lifting force on each section is balanced across the width of section. As the sections are rigid between the ends, this requires that the lifting forces be balance between the ends to ensure the even distribution across the cutter bar of each section and thus of all the sections. This is achieved in this embodiment by a balancing system which includes a linkage connecting the force to the wing section and particularly the balancing beam 34. Thus the balance beam 34 balances the lifting force applied to the ends of the center section relative to the lifting force which is applied to the outboard weight of the wing section so that the lifting force is even across the width of the header.

The inboard weight of the wing section is transferred through the pivot 27 to the outboard end of the center section and that weight is transferred directly to the balance beam 34. Also the outboard weight of the wing section is transferred through the link 31 and the bell crank 32 to the balance beam 34. Yet further a lifting force from the arm 21 is applied to the balance beam.

Figure 3:
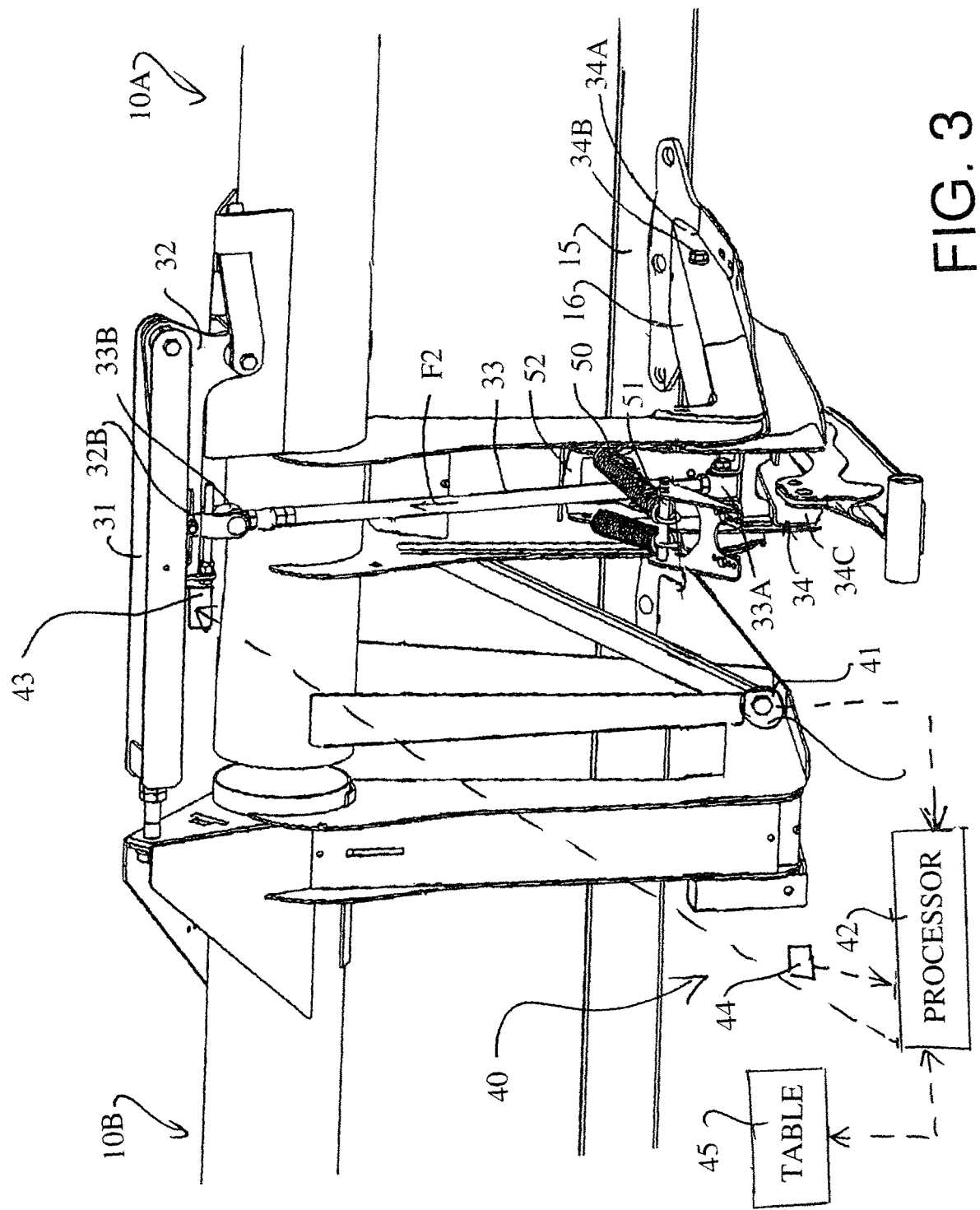
FIG. 3 shows an isometric view from the rear and one side of one embodiment of the header with the adapter removed and showing one embodiment of the adjustment system of the present invention.

Thus reviewing FIGS. 3 and 4, the balance beam 34 is located above the arm 21. The balance beam 34 has a forward end 34A which is pivotally connected to the frame member 15 at a transverse pivot pin 34B. The arm 21 extends forwardly to a forward lifting point 21A which engages underneath a forward end 34A of the balance beam. Thus the lifting force from the arm 21 is applied upwardly at the point 21A which is forward of the beam 14 and underneath the table 16.

The balance beam 34 extends rearwardly from the forward end 34A rearwardly to a rear end 34C to which is connected the compression link 33 at a bushing 33A. The compression link or compression member 33 thus applies an upward pushing force which acts to support the outboard weight of the wing section and also applies some lifting force to the center section through the bell crank 32.

The pivot pin 34B is attached to the center section so that some weight from the center section, which is not carried on the bell crank, is transferred to the pivot pin and through that pin to the balance beam 34.

The lifting force from respective one of the first and second lift arms 21 is wholly applied at the respective one of the first and second lifting positions 21A of the balance beam. Thus these three forces are all applied to the balance beam and the balance beam acts to automatically proportion the forces relative to the lifting force.

Thus the support assembly includes a first component which is the pin 34B to provide a lifting force for the center frame portion. The support assembly which is the linkage includes a second component which is a tension link 33 arranged to provide a lifting force F2 for the outboard weight of the second or wing frame portion.

The whole support assembly including the balance beam 34, the lift arm 21 and the springs 24 are arranged to provide a floating movement for each of the first and second frame portions that is the center and wing frame portions relative to each other and relative to the propulsion vehicle such that upward pressure from the ground on the skid element 16A which is greater in a downward force for a part of the weight of the header and supported by the lifting force tends to lift each of the center and wing frame portions relative to the propulsion vehicle.

The balance beam 34 is arranged such that the first and second lifting forces F1 and F2 are varied proportionally as the total lifting force FT is varied. As the force F2 includes the force lifting the wing section and a part of the force lifting the center section, this can be balanced relative to the lifting force F1 which applies a lifting force to the center section. The geometry of the balance beam and the linkage including the bell crank is arranged such that the balancing system defined thereby provides the lifting forces to the center section and wing section as defined above.

It will be noted that the linkage provided by the tension link 31, compression link 33 and the bell crank 32 includes no spring connection and is a direct mechanical linkage so that the spring action or floating action of the wing section is provided by the spring 24.

The balance beam 34 extends parallel to the arm 21 so that the pivot pins or bushings 34B and 33A have an axis at right angles to the balance beam and to the arm 21. The forces extend generally at right angles to the arm 21 since the arm 21 is generally horizontal underneath the header frame and underneath the balance beam.

The bell crank 32 is located and supported on the beam 14 so that the link 31 extends along the length of the beam 14 across the space 14A. Thus the link 31 is located above the pivot 27A and communicates forces by tension.

The compression link 33 is pivotally attached to the bell crank at a pivot connection pin 32B. The length of the arm 32C of the bell crank 32 can be adjusted by sliding the pin 32B along a slot 32D thus adjusting the mechanical advantage of the bell crank to vary the mechanical advantage or moment of the force F2 transferred to the outboard weight of the wing section. Thus the bell crank can be adjusted so that the forces F1 and F2 are balanced to produce approximately uniform contact pressure between the ground and the skid shoe. The bell crank 32 is pivoted at pin 32E carried on a support 32F attached to the frame. The link 31 attaches to the bell crank 32 at the pin 32G.

It will be appreciated that the balance system using the balance beam 34 and the links 32 and 33 is merely one of many examples of design of balance system which can be used.

In the system shown in the above patents and as manufactured and sold by MacDon there is a requirement for the operator to periodically adjust the wing balance by adjusting the position of the pin 32B along the link 31.

According to the present arrangement, there is provided an adjustment system one embodiment of which is shown in FIG. 3 and is generally indicated at 40. This arrangement 40 is arranged to provide adjustment automatically of the balance system to maintain said balanced ground force distribution.

The adjustment system 40 includes a first sensor 41 at the pivot pin 27A to the left wing 10B and a second sensor (not visible) at the corresponding pivot pin of the second wing 10C. In this embodiment the sensors 41 are angle sensors mounted at the pin 27A which detect the angle of the wing 10B relative to the center portion 10A and any changes therein over time as the wing floats upwardly and downwardly as described above.

Thus each sensor independently acts repeatedly, over a time period during which the header is operating in said harvesting operation, to detect the changing positions of each wing frame portion relative to the center frame portion.

The system 40 further includes a processor 42 arranged in response to the positions sensed by the sensors to calculate a value representative of the positions of the wing frame portions over a set time period.

Figure 5:
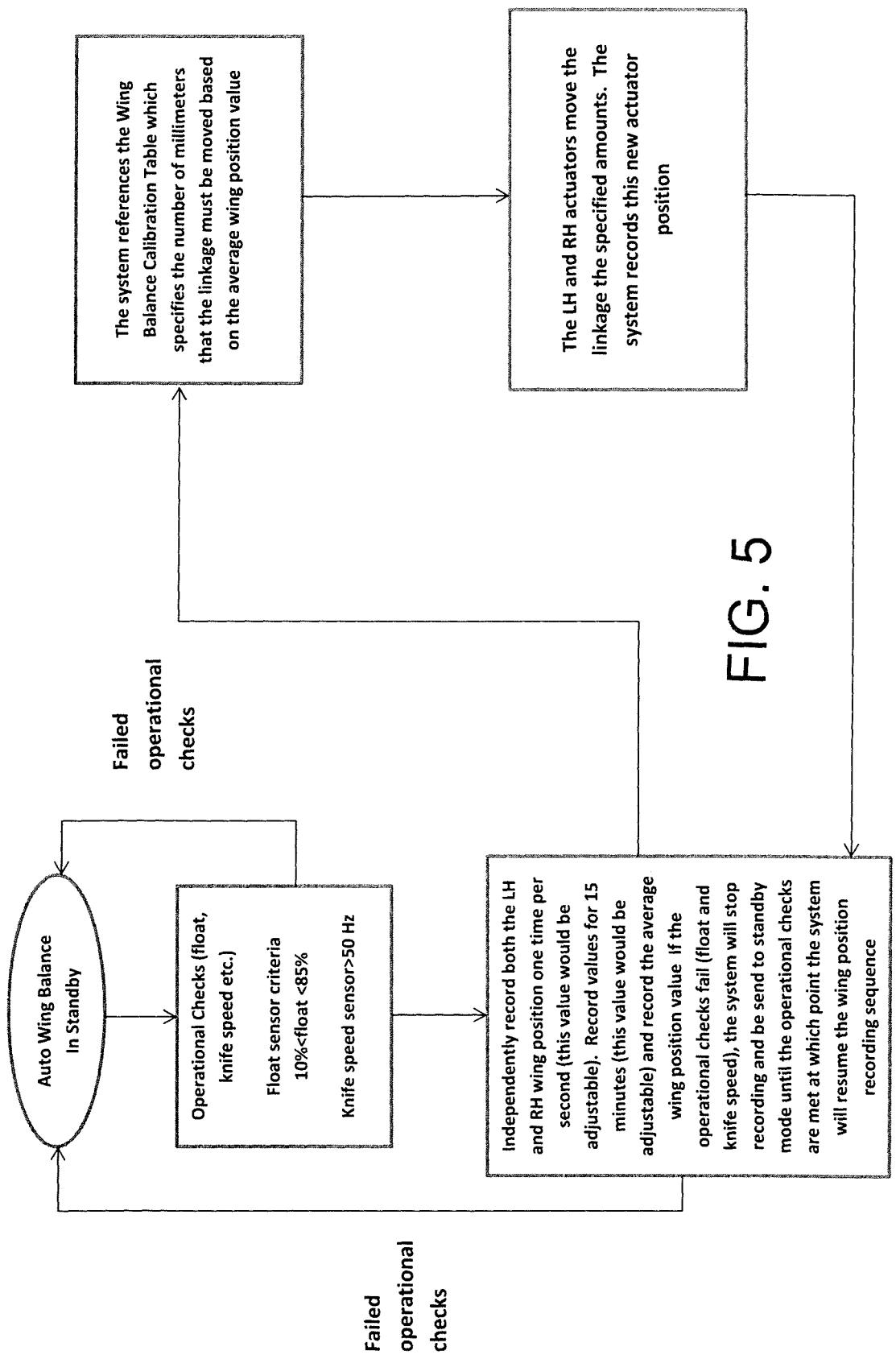
FIG. 5 is a schematic illustration of the system logic of the apparatus according to the present invention.
Figure 6:
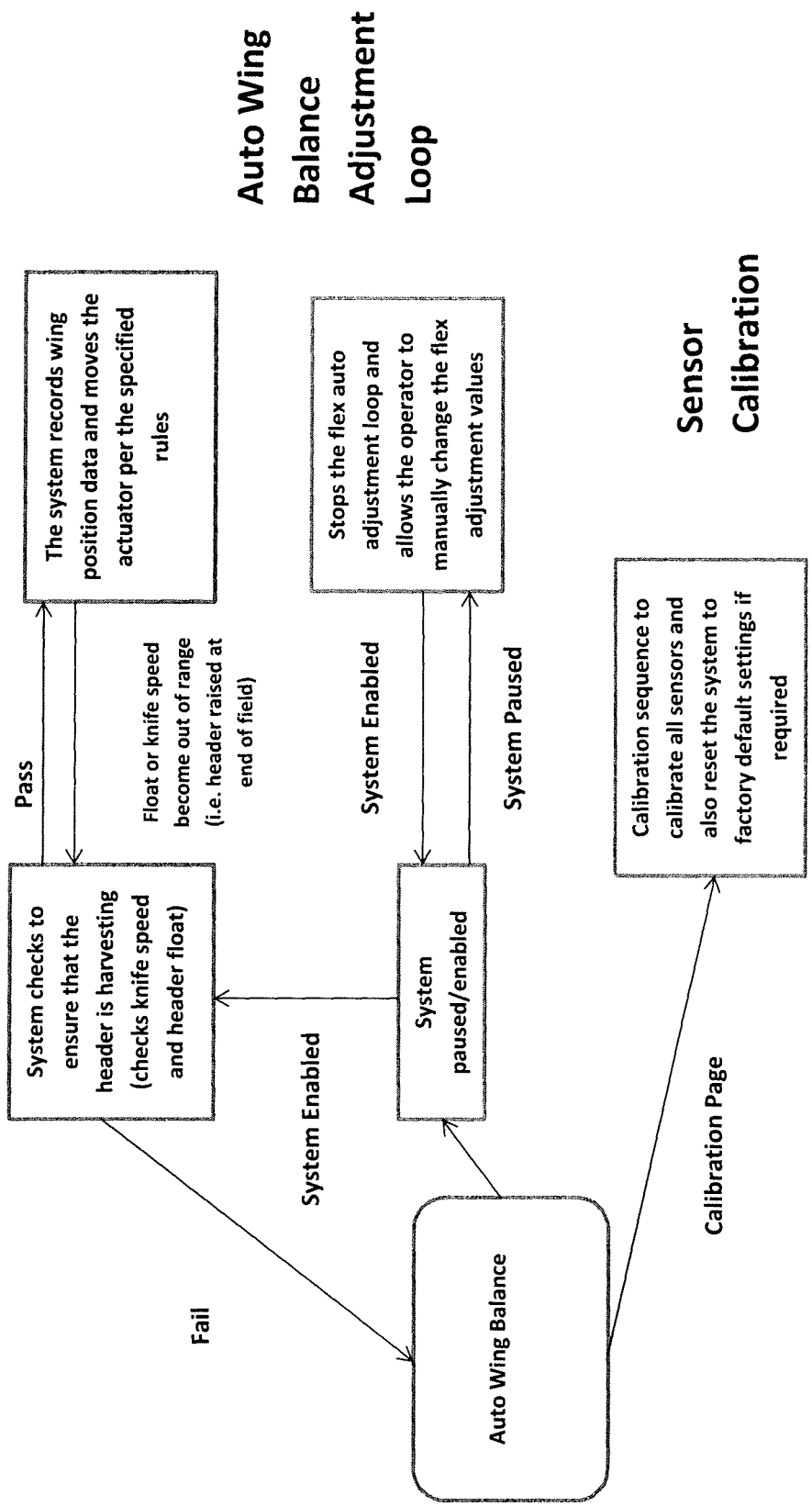
FIG. 6 is a schematic illustration of the adjustment logic of the apparatus according to the present invention.

Thus as shown in FIGS. 5 and 6, the processor 42 receives the signals from the sensors 41 and independently records the left and right wing positions determined by the angle sensor repeatedly, for example once per second, over a set period of time, for example 15 minutes. The processor then calculates from these signals an average value. These calculation are carried out only when the harvesting system is operating to avoid distorting the results from stationary data or data obtained when the header is not on the ground. A sensor 44 provides an input indicative of header operation for example from the cutter bar.

Based on the difference of the average value calculated from the nominal zero difference expected when the header is operating properly, the processor accesses a look-up table 45 to determine how much out of setting the adjustment is presently determined to be. In response to this value from the look up table 45, an actuator 43 at the adjustment 32B is operated to move the adjustment to the newly determined proper location.

Thus in effect, the average values calculated allow the processor to provide an indication as to whether the wing frame portions are predominantly raised or predominantly lowered during the time period. That is the wings will be raised and lowered at different times during operation depending on ground height but the average over a set time period should be zero.

For example the sensor 44 for detecting whether the header is operating includes a knife speed sensor.

As two separate sensors are provided, one for each wing, this allows the processor to use in calculation independent sensor data relating to the independent positions of the wing frame portions to determine independent adjustment values for the separate wing frame portions from the independent sensor data. However in some balance systems the wings may be adjusted as a common single adjustment.

The processor and/or the look up table 45 may provide an output such that when the value is within a predetermined range of acceptability outside of the nominal zero value, no adjustment is made.

The processor also records the new adjustment position after an adjustment is effected. The processor can also halt the adjustment system to allow the operator to override the input values and re-set to a required operator value. The system can also be used to re-set to a factory default setting and can include a sub-program for sensor calibration.

For the factory default reset feature, the system will look up values from a table 45 which will set the flex linkage to a theoretically correctly adjusted position based on the header size and optional equipment. This feature is used to position the linkage where it should be theoretically and is intended for use on initial header setup and if issues arise during the auto adjust sequences. The factory reset is used as a starting point and continual refinement of the calibration is done by the system while the header is harvesting.

As shown in FIG. 4 there is provided an alternative system 40A in which the processor 42A receives signals from a series of height sensors 41A, 41B, 41C and 41D at ends of the wing portions 10B and 10C and at the ends of the center portion 10A. These act to detect the height of the sensor and thus the portion on which it is mounted from the ground. In this way the system detects a distance of each of the wing frame portions and the center frame portion from a component relative to which each of the portions moves, in this case the ground. Over the period of time, all three sections should statistically have the same average distance from the ground and any variation in this distance is indicative of the wings being too heavy or too light thus requiring an adjustment as set forth above.

As shown in FIG. 1, there is provided a further alternative system in which there is provided a plurality of separate ground engaging elements 50 at spaced positions along the main frame structure 14 for supporting the cutter bar from the ground. Thus there are center elements 50 which generally support the center section and wing elements which are mounted at or adjacent the outer end of each wing. Each element includes a load sensor 51 for providing an output related to a force applied by the header through the respective ground engaging elements to the ground. Thus the system operates, for detecting data relating to a condition of the balance system, by detecting a force applied by each of the wing frame portions and the center frame portion to the ground.

This data is then monitored over a selected time period and provides information on the load applied by each of the sections to the ground which is indicative of its position relative to the other sections. This data when collected over time can be used to generate a value for effecting the adjustment of the balance system.

This ground engaging elements can be formed by a wheel system or a skid and are used as disclosed in U.S. Pat. No. 9,775,291 (Neudorf) issued Oct. 3 2017 to support the header when cutting off the ground. The arrangement shown in pending U.S. application Ser. No. 15/661,663 filed Jul. 27 2017 can also be used and the disclosures of these documents are incorporated herein by reference.

The invention claimed is:

1. A crop harvesting header for use in a harvesting operation comprising:
 a main frame structure extending across a width of the header for movement in a forward direction generally at right angles to the width across ground including a crop to be harvested;
 a mounting assembly for carrying the main frame structure on a propulsion vehicle;
 a cutter bar across a front of the main frame structure arranged to move over the ground in a cutting action;
 the main frame structure including a center frame portion, a first wing frame portion and a second wing frame portion;
 each of the wing frame portions being connected to the center frame portion by a pivot coupling arranged for pivotal movement relative to the center frame portion about a pivot axis extending in a generally forward direction to positions of the wing frame portion which are in line with, raised above and lowered below the center frame portion;
 a balance system for applying a lifting force to the center frame portion and a balanced wing lifting force to each of the wing frame portions to support the wing frame portions to provide a balanced ground force distribution across the width of the header including the center frame portion and the wing frame portions, wherein the balance system comprises:
  a balance beam having a forward end and a rear end, wherein the forward end of the balance beam is pivotally connected to the center frame portion;
  a tension link having a first end and a second end, wherein the first end of the tension link is connected to one of the wing frame portions;
  a bell crank having a first arm and a second arm extending from a pivot point, wherein the first arm of the bell crank includes a slot, the pivot point of the bell crank is pivotably connected to the second end of the tension link, and the second arm of the bell crank is pivotably connected to the center frame portion; and
  a compression link having a first end pivotally connected to the slot in the bell crank and a second end pivotably connected to the rear end of the balance beam; and
 an adjustment system arranged to provide adjustment of the balance system to maintain said balanced ground force distribution, the adjustment system comprising:
  at least one sensor repeatedly, over a time period during which the header is operating in said harvesting operation, detecting data relating to a condition of the balance system;
  a processor arranged in response to said data sensed by said at least one sensor to calculate a value representative of said data of the wing frame portions over the time period;
  the adjustment system effecting an adjustment of the balance system in response to said value.

2. The header according to claim 1 wherein said at least one sensor is arranged to detect positions of each wing frame portion relative to the center frame portion.

3. The header according to claim 2 wherein said at least one sensor operates, for detecting said positions of each wing frame portion relative to the center frame portion, by detecting movement of a component of the wing frame portion relative to a component of the center frame portion.

4. The header according to claim 3 wherein said at least one sensor operates by detecting a change of angle of a component of the wing frame portion relative to a component of the center frame portion.

5. The header according to claim 2 wherein said at least one sensor operates, for detecting said positions of each wing frame portion relative to the center frame portion, by detecting a distance of each of the wing frame portions and the center frame portion from the ground and there is provided a plurality of sensors detecting the height of the portions from the ground.

6. The header according to claim 1 wherein said at least one sensor operates, for detecting data relating to a condition of the balance system, by detecting a distance of each of the wing frame portions and the center frame portion from the ground.

7. The header according to claim 1 wherein said at least one sensor operates, for detecting data relating to a condition of the balance system, by detecting a force applied by each of the wing frame portions and the center frame portion to the ground.

8. The header according to claim 7 wherein there is provided a plurality of separate ground engaging elements at spaced positions along the main frame structure for supporting the cutter bar from the ground and said at least one sensor comprises a plurality of separate sensors each arranged at a respective one of the ground engaging elements for providing an output related to a force applied by the header through the respective ground engaging elements to the ground.

9. The header according to claim 1 including at least one sensor for detecting whether the header is operating in said harvesting operation.

10. The header according to claim 9 wherein said at least one sensor for detecting whether the header is operating includes a knife speed sensor.

11. The header according to claim 1 wherein the processor calculates as said value an indication as to whether the wing frame portions are predominantly raised or predominantly lowered during the time period.

12. The header according to claim 1 wherein the processor receives and uses independent sensor data relating to the two wing frame portions to calculate independent values for each of said wing portions value and said adjustment system is arranged for adjusting the balance system for each of the wing frame portions independently.

13. The header according to claim 12 wherein the processor determines independent adjustment values for the separate wing frame portions from the independent sensor data.

14. The header according to claim 1 wherein the processor records the data while harvesting over a set period of time.

15. The header according to claim 14 wherein the processor calculates as said value an average position of said wing frame portions over the set period of time.

16. The header according to claim 1 wherein the processor includes a look up table for determining an amount of adjustment in relation to the calculated value.

17. The header according to claim 1 wherein the processor is arranged such that when the value is within a predetermined range of acceptability, no adjustment is made.

18. The header according to claim 1 wherein the processor records the new adjustment position after an adjustment is affected.

* * * * *